United States Patent
Westhoff et al.

[11] Patent Number: 5,997,006
[45] Date of Patent: Dec. 7, 1999

[54] BIDIRECTIONAL GASKET HAVING WATER ENERGIZING POCKETS

[75] Inventors: James A. Westhoff, Langhorne; James A. Kelly, Reiglesville, both of Pa.

[73] Assignee: Poly-Tec Products, Inc., Tullytown, Pa.

[21] Appl. No.: 08/947,755

[22] Filed: Oct. 9, 1997

[51] Int. Cl.$^6$ .................................................. F16L 5/02
[52] U.S. Cl. ..................... 277/604; 277/605; 277/626; 52/220.8
[58] Field of Search ..................... 277/602, 604, 277/605, 615, 616, 626, 637, 644, 645, 649, 906; 52/220.8, 741.4; 404/25, 64, 65; 285/230

[56] References Cited

U.S. PATENT DOCUMENTS

| | | | |
|---|---|---|---|
| Re. 34,787 | 11/1994 | Westhoff et al. ........................ | 277/605 |
| 3,172,237 | 3/1965 | Bradley ................................. | 404/64 X |
| 3,323,426 | 6/1967 | Hahn ..................................... | 404/65 X |
| 3,521,528 | 7/1970 | Wangerow ............................. | 404/65 X |
| 4,508,355 | 4/1985 | Ditcher ................................... | 277/605 |
| 5,529,312 | 6/1996 | Skinner et al. ......................... | 277/604 |
| 5,741,015 | 4/1998 | Skinner .................................. | 277/559 |

FOREIGN PATENT DOCUMENTS 650078   10/1962   Canada ................................. 277/604

Primary Examiner—Lynne H. Browne
Assistant Examiner—Greg Binda
Attorney, Agent, or Firm—Louis Weinstein

[57] ABSTRACT

A bidirectional gasket providing a water-tight seal between a manhole assembly and a pipe, having a T-shaped anchoring portion for embedment in a manhole opening. An A-shaped pipe engagement portion joined to the anchoring portion by a connecting web facilitates bending of the gasket. The A-shaped portion has "legs" and recesses forming water pockets preventing water from entering between gasket and pipe. The gasket durometer enhances the water tight seal of the legs with increasing water pressure. The pipe engaging portion accommodates a greater outside pipe diameter compared with conventional connectors due to reduced volume, by providing voids within the connector. The gasket accommodates diameter deflection or ovation in rigid and flexible pipe materials. The A-shaped profile provides greater angular deflection and/or pipe misalignment allowance compared with conventional connectors. Tapered projections near the apex wipe the pipe external periphery upon insertion and further contribute to compression of the connector in the nose portion, preventing the projection from flipping over during pipe insertion. The web joining the anchoring and pipe engagement portions has a tapered cross section, increasing in thickness toward the pipe engagement portion, enhancing compression of the web against the pipe. The connecting web and interior periphery of the T-shaped portion have integral projections which eliminate profile thinning and significantly reduce water infiltration. The simplified water pocket recesses ease installation problems and prevent pull-in of the water pocket which results in connector failure.

9 Claims, 2 Drawing Sheets

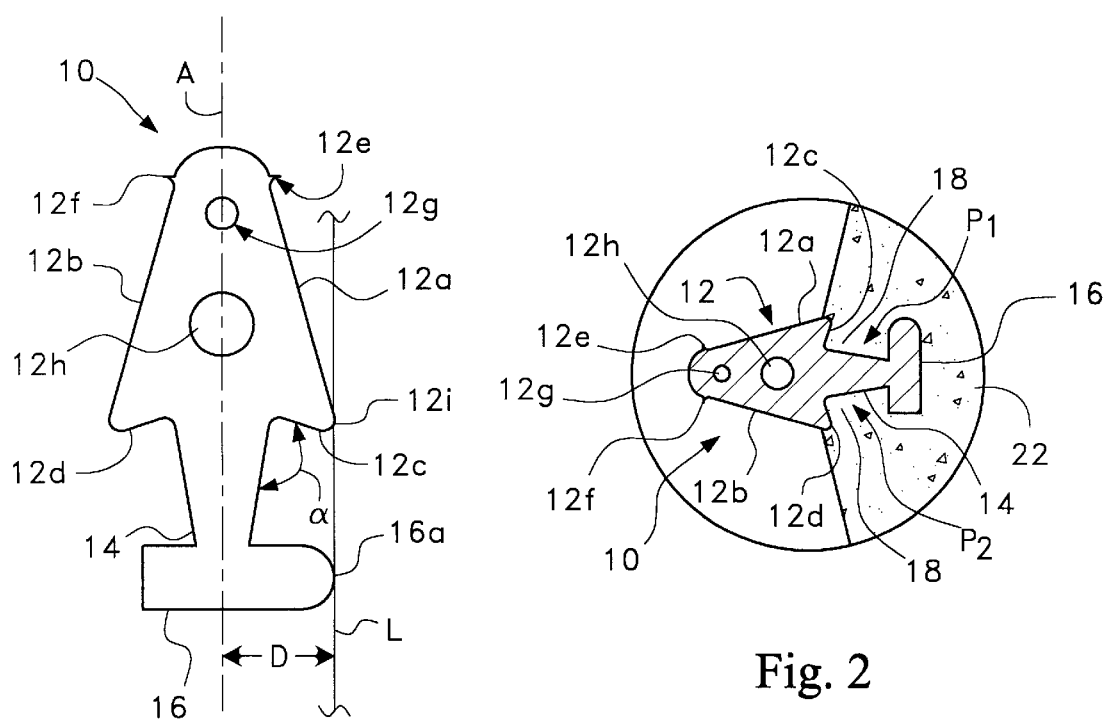
Fig. 1
Fig. 2
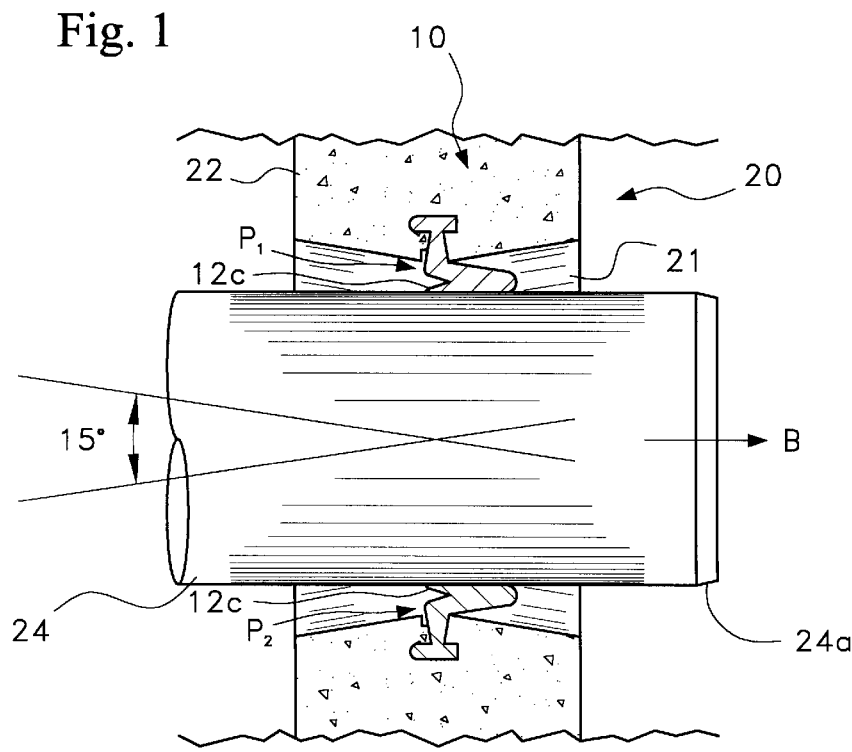
Fig. 3

BIDIRECTIONAL GASKET HAVING WATER ENERGIZING POCKETS

FIELD OF THE INVENTION

The present invention relates to gaskets for providing a water-tight seal between a manhole opening and a pipe extending into said opening and more particularly to a novel bi-directional gasket having self-energizing water pockets for ensuring and enhancing a water-tight seal between pipe and gasket and for improving gasket compression against the pipe.

BACKGROUND OF THE INVENTION

Rubber (and/or rubber-like) connectors are utilized to provide a water-tight seal between an opening in a manhole assembly, for example, and a pipe extending into the opening. U.S. Pat. No. 4,159,829 assigned to the assignee of the present invention discloses a conventional bi-directional connector formed from an extrusion having a hollow pear-shaped head portion integrally joined to a T-shaped anchoring flange. A connector ring is formed by cutting an extruded sectional length and curling it to form a substantially tight-cylinder configuration with the mating edges being joined. The pear-shaped head portion deflects from a radially inwardly extending orientation upon insertion of a pipe. The resiliency of the head portion is improved by providing a single cavity to obtain moderate sealing pressure.

U.S. Pat. No. 4,508,355, also assigned to the assignee of the present invention constitutes an improvement over U.S. Pat. No. 4,159,829 by providing a gasket of similar shape having a plurality of internal cavities extending longitudinally through the head portion to provide the desired resiliency while at the same time providing improved stability of the gasket, yielding a stronger, more uniform seal about the exterior of the pipe extending therethrough, including portions of the pipe surface which may be significantly out-of-round.

The above designs have the disadvantage of providing a water-tight seal which weakens as water pressure applied to the gasket increases and which have very narrow tolerance limits with regard to the range of pipe outer diameter that can be accepted by a gasket thereby greatly increasing the number of gaskets required to cover a large range of pipe outer diameters, typically from 4" to 84".

The assignee of the present invention has further developed a gasket which is described in U.S. Pat. No. Re. 34,787, which gasket provides water pockets that enhance the water-tight seal with increasing pressure. The gasket described therein has a T-shaped anchoring portion and a substantially A-shaped or pear-shaped pipe engaging head portion similar to those found in conventional gaskets. However, the head portion of the improved gasket is provided with a recess near its wide end defining a pair of legs extending away from the head portion which act as water seal flaps. The midpoint of the recess is joined to the anchoring portion by an integral connecting web having a thickness which is significantly reduced relative to the thickness of the adjacent anchoring portion to facilitate bending of the web and hence the gasket.

A connecting web cooperates with the legs and recess to form a pair of water pockets, one of which becomes active dependent upon the direction which the gasket is deflected, to provide a water-tight seal which seal increases in effectiveness with increasing water pressure imposed upon the gasket.

The water pockets in the gasket disclosed in U.S. Pat. No. Re 34,787 has been found to have certain disadvantages which include the tendency of the water pocket to flip over during insertion of a pipe. In addition, the connecting web has been found to significantly reduce the compression of the gasket against the pipe.

The gaskets of the type described in U.S. Pat. No. Re 34,787 are normally extruded and then cut to size to form a gasket of the desired diameter. During the extrusion process, the gaskets are extruded so that the axis of symmetry of the extrusion is horizontally aligned as the extrusion leaves the die in order for the extrusion to be placed on its side upon a conveyor which carries the extrusion through a curing medium. The geometry of the extrusion is such that the imbedment portion of the extrusion and specifically the web connecting the imbedment portion to the head portion deviates from the normal line of symmetry due to the fact that the extrusion is not able to retain the desired symmetrical orientation because the extrusion is sufficiently soft prior to curing, so that a bend developed as the extrusion is conveyed through the curing region becomes fixed as a result of the curing operation. Thus, when the extrusion is cured, the connecting web and embedment portion deviates from the desired symmetry and becomes misaligned within the cast member into which it is embedded thereby significantly reducing and weakening the ability of the cast member to properly retain the gasket embedded within the cast member.

The design of the water pockets in the gasket disclosed in U.S. Pat. No. Re 34,787 further complicate the joining of the gasket ends necessitating the employment of a plurality of inserts in order to assure proper alignment of the ends of the extruded section being joined thereby complicating the joining operation and degrading the accuracy of the alignment of the end sections of the extrusion being joined, especially in the regions of the water pocket, as well as requiring additional pin-like joining members inserted into adjacent ends of the cut length of the extruded member to assure that said ends are properly joined.

It has been found that the embedment portion of the gasket undergoes some stretching and hence thinning as a pipe is inserted into the gasket, which is disadvantageous as it severely reduces the ability to prevent infiltration of water around the waterstop, especially in drycast assemblies.

BRIEF DESCRIPTION OF THE INVENTION

The present invention is characterized by comprising a design which overcomes the disadvantages of the prior art through the use of a gasket design having a substantially pear-shaped head portion joined to a T-shaped imbedment flange by means of a connecting web. The head portion is provided with one or more openings which, when the extruded profile is curled and its ends joined to form a gasket, provide hollow annular cavities, which serve to control resiliency and compressibility of the head portion.

The head portion is provided with a pair of wiper projections on opposite sides of the tapered narrow end thereof and arranged in symmetrically fashion. The head portion tapers from the narrow end toward the wide end thereof in a radially outward direction and then extends inwardly to define surfaces which are diagonally aligned relative to an axis of symmetry of the gasket, serving to define a pair of water pockets.

The web joining the imbedment portion of the gasket tapers from a narrow end joined to the imbedment portion to a wider end joined to the central region of the pear-shaped head portion. The increasing width of the web provides increasing resistance to be(ndabihty of the gasket when receiving a pipe, thereby providing a better water-tight seal between the head portion and the pipe. The increased thickness of the pear-shaped head portion in the region of the water pockets serves to prevent the water pocket from bending over backwards during insertion of a pipe, thereby assuring proper orientation of the gasket relative to the pipe and enhancing the effectiveness of the active water pocket. The increased thickness of the connecting web as well as the increased gasket material in the wide end of the head portion further serve to provide additional gasket material to support the pipe received by the gasket.

In order to prevent water infiltration in the embodiment portion, the embedment portion of the gasket is provided with a triangular-shaped portion projecting outwardly from and integral with the T-shaped embedment flange and the connecting web is provided with integral projecting portions extending outwardly from opposing sides of the connecting web. These projections help to reduce, if not eliminate profile thinning due stretching and further serve to increase protection against water infiltration, especially in drycast applications.

One of the flanges of the imbedment portion of the gasket is increased in length so that distance of its outer most edge from the aforementioned line of symmetry is equal to the distance of the outer most edge of the pear-shaped head portion lying to the same side of the axis of symmetry as said longer flange. These edges rest upon the conveyor assuring that both the imbedment portion and web portion retain their proper orientation as they are fed upon the conveyor and conveyed through the curing region so as to assure proper symmetry of the extrusion and prevent misalignment thereof

OBJECTS OF THE INVENTION

It is therefore one object of the present invention to provide a novel bi-directional gasket for providing a water-tight gasket/pipe seal which is superior to that of conventional gaskets of similar design and which is simpler to manufacture and assemble.

Another object of the present invention is to provide a novel bidirectional gasket having water pockets designed to enhance the effectiveness of the water-tight seal with increasing water pressure imposed upon the gasket and further being designed so as to prevent the water pockets from bending over during insertion of a pipe and/or during use thereof Still another object of the present invention is to provide a novel bi-directional gasket having a flange designed to cooperate with the head portion of the gasket to retain the alignment of the gasket as it is moved through a curing region along a conveyor.

Still another object of the present invention is to provide a novel bidirectional gasket having energizable water pockets and a connecting web to provide additional support of an inserted pipe.

Still another object of the present invention is to provide a novel gasket having integral projections in the embedment portion to reduce profile thinning and to eliminate or significantly reduce water infiltration especially in drycast applications.

BRIEF DESCRIPTION OF THE FIGURES

The above, as well as other objects of the present invention, will become apparent when reading the accompanying description and drawings in which:

FIG. 1 shows a cross section of a gasket designed in accordance with the principles of the present invention.

FIG. 2 shows a detailed sectional view of the gasket of FIG. 1 in the position occupied by the gasket within a manhole opening before insertion of a pipe.

FIG. 3 shows a sectional view of the gasket of FIG. 1 with the pipe inserted therein.

DETAILED DESCRIPTION OF THE INVENTION AND PREFERRED EMBODIMENTS THEREOF

Figure 4A:
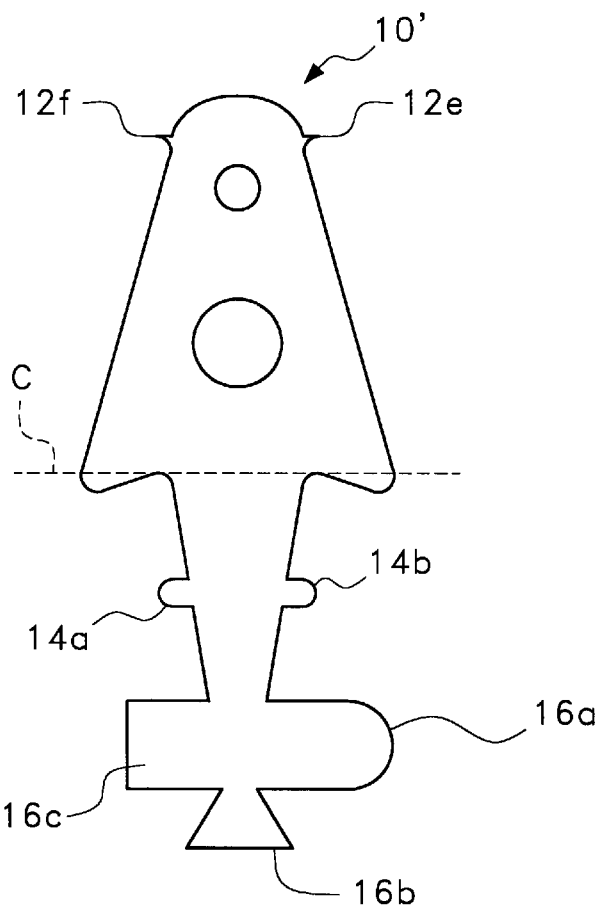
FIGS. 4a and 4b are sectional views of gaskets having a unique design in the embedment portion thereof to reduce profile thinning and eliminate or significantly reduce water infiltration in the waterstop region.

Making reference to FIGS. 1 and 2, the gasket 10 of the present invention is preferably formed from a continuous extrusion of a suitable synthetic elastomeric material.

The extrusion is shown in cross-section and is comprised of a pair-shaped or A-shaped head portion 12 provided with tapered sides 12a, 12b, which taper outwardly so as to terminate in a pair of legs 12c, 12d arranged at the wide end of the head portion.

Integral projections 12e and 12f arranged symmetrical about a longitudinal axis of symmetry A serve as wiping members for wiping lubricant from an inserted pipe, as will be more fully described.

Gasket 10 is formed of a suitable rubber or rubber-like material selected to provide a gasket having a durometer of the order of 50-55, which is comparable to conventional gaskets, for example, those gaskets of the type described in the aforementioned '787, '355 and '829 patents.

The volume, weight and compressibility of head portion is further controlled to the provision of cavities 12g and 12h, which are likewise symmetrically located with respect to the axis of symmetry A, which further extends through the mid-line of the anchoring portion P, comprising the foot portion 16 and the connecting web 14, as will be more fully described hereinbelow.

Cavities 12g and 12h are substantially continuous about the annular gasket.

Cavities 12g and 12h are preferably of different diameters, cavity 12h being larger than cavity 12g. The location of the cavities, in addition to reducing the material present in the gasket to provide the desired resilience, nevertheless provide lateral stability to the structure which assures the maintenance of configurational integrity, causing the desired function of the gasket to be retained despite the large forces exerted upon the gasket by the pipe inserted therethrough.

Gasket 10 is further comprised of a T-shaped anchoring portion P which includes integral foot portion 16 and connecting web 14, which, as can best be seen in FIG. 2, are adapted to be imbedded in the cast material 22 (which is typically concrete).

The A-shaped portion 12 is joined to connecting web 14 which is integrally joined to the wide end of head portion 12.

The connecting web 14 has its narrow end integrally joined to the foot portion 16 and tapers to a greater thickness toward the A-shaped portion 12 to provide additional rubber in the immediate region of the A-shaped portion 12 to better control the resiliency and bending characteristics of the gasket and prevent undue stretching.

The wide end of A-shaped portion 12 is provided with surface portions 12c and 12d, which are diagonally aligned relative to the axis of symmetry A, forming an inverted, V-shaped surface and cooperating with web 14 to form a pair of inverted, V-shaped water pockets each of an acute angle a with the adjacent surface of the connecting web 14.

These substantially V-shaped regions comprise a pair of self-energizing, water pockets P1, P2, which serve to increase the effectiveness of the water-tight seal as the water pressure applied to the gasket in the region of the pockets P1, P2 increases, as will be described hereinbelow.

A gasket of the desired size and diameter is formed by first forming an extrusion of the gasket profile, shown in cross-section in FIG. 1.

As the gasket profile is extruded from the extruder, it is laid upon a conveyor which conveys the extrusion through a curing region.

As the curing operation begins, and before the extrusion is fully cured, the extrusion is soft. The end 16a of foot portion 16 is designed so that the distance between its extreme end and the axis of symmetry A is D, which is equal to the distance D between the tip 12i and the axis of symmetry A. In addition, both tip 12c and the end portion 16a are rounded so as to make minimal engagement with the supporting surface of a conveyor represented by line L. More specifically, the gasket profile is extruded so that the extrusion, when it leaves the die head, has its axis of symmetry horizontally aligned. As the horizontally aligned extrusion leaves the die head, it is fed to a horizontally aligned conveyor. The end of portion 16a and the tip 12i rest upon the conveyor surface. The arrangement described hereinabove assures that the extruded member maintains its configuration as shown in FIG. 1 throughout the curing process.

In contrast, the prior art design was such that the portion 16a was of the same design and length as the left-hand portion 16c, for example, so that when the portion 12i and the straight foot portion of the uncured extrusion engaged the conveyor, the foot portion was drawn down by gravity to the conveyor causing the web to bend away from the axis of symmetry due to the fact that the end of the web 14 joined to the foot portion 16 is caused to move closer to the conveyor surface than the end of the web joined to the A-shaped head portion 12. This bending occurred throughout the curing region causing the extrusion to be cured with an undesirable bend in the connecting web 14, which undesirable bend was retained due to the memory characteristic of the rubber or rubber-like material of the gasket. The design of the present invention prevents such an undesirable bend from occurring.

Once the extrusion is formed and cured, a gasket of the desired size and diameter is formed by cutting the extrusion to a proper length and forming the cut portion into a circle with the free ends of the gasket being bonded together to provide a ring-shaped gasket. The joining and bonding techniques utilized for forming the ring-shaped gasket are conventional and may, for example, incorporate the techniques described in the aforementioned '355 and '829 patents, whose descriptions are incorporated herein by reference thereto.

As part of the joining process, it is conventional to use pin-like members, which are inserted into ends of the adjacent gasket to align the ends while they are joined. The water pockets of the '787 reissue patent have been found to be difficult to maintain in alignment, whereas the water pockets P1 and P2 of the present invention greatly simplify the production steps for making a gasket as well as assuring highly accurate alignment of the two ends being joined.

Although the gasket of the present invention lends itself readily to formation through the employment of an extrusion technique, it is possible to mold the gasket, if desired. Molded gaskets have all the characteristics of the extruded gasket shown in FIG. 10 except for the omission of the openings 12g and 12h.

Gasket 10 is embedded within a manhole assembly, for example, through the use of conventional positioning rings, such as, for example, those shown in the above-identified '829 patent with particular reference being made to FIGS. 6 and 7 and the descriptive portions of the specification related thereto.

FIG. 2 shows the gasket 10 of the present invention installed within opening 21 inside wall 20 which may, for example, be the side wall of a manhole assembly and, more particularly, a manhole base cast, for example, from a suitable material such as concrete.

FIG. 2 shows an enlarged view of the gasket in cast material 22 and in the undeflected position normally assumed prior to insertion of a pipe. Each portion 12c, 12d is partially embedded in the cast material. Note portion 12d in the region 18 of the cast material.

FIG. 3 shows the manner in which a pipe 24 is inserted with an opening 21.

Pipe 24 is moved into opening 21 from the left-hand end thereof and it urged in the direction of arrow B. Pipe 24 may be provided with a tapered portion 24a at its forward end to facilitate insertion into the circular opening defined by the gasket 10.

The outer surface of pipe 24 is preferably coated with a lubricant to further facilitate insertion of the pipe into the gasket.

FIG. 3 shows the pipe after insertion, which causes the gasket to undergo bending from the undetected position shown in FIG. 2 to the deflected position shown in FIG. 3. The projection 12e permits easier coupling by allowing the lubricant to remain in the immediate area where the gasket and the pipe surface meet, which insures that the proper amount of lubricant remains on the surface of the pipe to prevent tearing or frictional wear of the gasket profile during coupling.

When the pipe is moved to the desired position, the lubricant typically used in pipeline construction actually creates a frictional bond between the gasket and the pipe surface as the lubricant disperses. In addition, projection 12g is compressed between the main body 12a of the gasket and the pipe when the pipe is moved to the final position, further aiding in the provision of a good water-tight seal.

The bending of gasket 10 serves to urge leg 12c which is partially imbedded in the opening, to be moved away from the partial imbedment position shown in FIG. 2 to the position shown in FIG. 3. The bending of the gasket urges the leg 12c against the surface of pipe 24 which significantly increases the surface area of the contact between the gasket and the pipe.

The self-energized water pocket P1, in addition to blocking water from passing from the external side of sidewall 20 into the region between the gasket and pipe, further provides a self-energizing function wherein the build-up of water pressure within pocket P1 applies an increasing force upon head 12 and leg 12c which apply increasing pressure upon the surface of the pipe, with the result that the seal improves as the water pressure increases. In addition the likelihood that an imperfection in the pipe surface would create or cause a failure in the water-tight seal is greatly reduced.

The increasing thickness of the substantially tapered-shaped (V-shaped) legs 12c and 12d also prevent the leg engaged by the pipe from being flipped over.

It was found that the leg of the gasket engaged by the pipe in the gasket disclosed in the '787 reissue patent would flip over, especially when engaged by a pipe having a rough outer surface. The provision of the significantly increased thickness of the leg moving away from the corner 12i thereof prevents the leg engaged by the pipe from flipping over assuring proper orientation and operation of the water pocket.

The increasing thickness of the connecting web 14 is such that the widest end of the web 14 is integrally joined to the head-shaped portion, which provides significantly greater resistance to bending and stretching of the gasket, which further enhances the water-tight seal, especially when compared with the gasket of the '787 reissue patent.

Gasket 10 of the present invention permits a significant degree of pipe misalignment without affecting the water-tight seal. FIG. 3 shows the angle of deflection, which may be as much as 15° from the desired longitudinal axis, while at the same time maintaining a good water-tight seal, which compares very favorably with conventional gaskets which provide a maximum deviation of 10°.

As was mentioned hereinabove, legs 12c, 12d are closer to a plane passing through the center of foot portion 16 than the interior corners forming the pockets P1 and P2 and extend partially into the opening 21 and wall 22. In the example shown in FIG. 3, leg 12c snaps away from the position shown in FIG. 2 upon deflection of the gasket. The penetration of the legs 12c, 12d into opening 21 maximizes the length of the legs while preventing legs from being locked into the cast material and thereby being prevented from engaging pipe 24.

Employing a gasket material having a durometer of the order of 55-55 for extruded gaskets and 40-45 durometer for molded gaskets increases the compressibility of the gasket, enabling the gasket to deflect from the undeflected position of FIG. 2 to that shown in FIG. 3 further enables the gasket flange 12c for example, to experience compression due to the build up of water pressure within the self-energizing pocket P1. The durometer of the gasket coupled with voids 12g and 12h enables the gasket to accommodate a pipe diameter tolerance range which is significantly greater than that of conventional gaskets of similar design due to the reduction in physical volume and rubber durometer. The gasket 10 of the present invention is capable of accommodating diameter deflection and/or ovation in flexible pipe materials.

The coupling pressure of gasket 10 (in the absence of water pressure in a water pocket) is comparable to conventional gaskets of similar design due to the rubber durometer and overall diameter while at the same time providing a good water-tight seal which increases in effectiveness due to the self-energizing water pocket design.

Figure 4B:
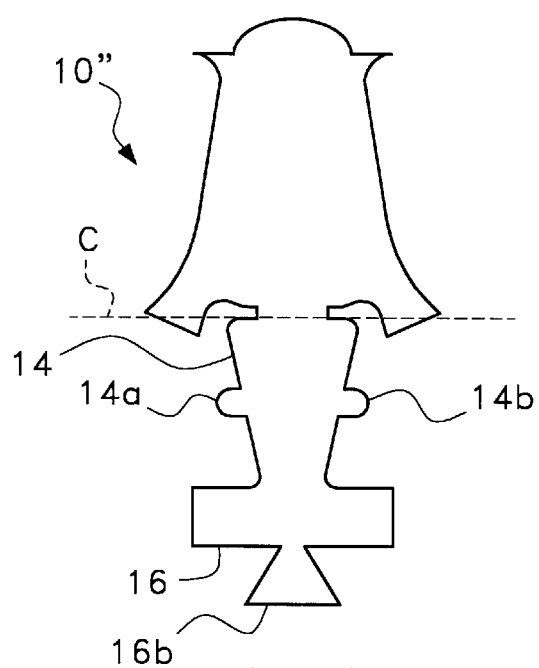

FIGS. 4a and 4b show further embodiments of the present invention.

FIG. 4a shows embodiment 10' which is similar to the embodiment 10 of FIG. 1 and wherein like elements are designated by like numerals. For purposes of brevity, only the new features will be described hereinbelow.

As was set forth hereinabove, the gasket undergoes both bending and stretching as it is moved from the position shown in FIG. 2 to the position shown in FIG. 3 during insertion of a pipe 24. Stretching of the gasket causes the gasket and specifically the embedded portions thereof to experience profile thinning which causes infiltration around the waterstop. This is especially true in drycast applications. Incidentally, dotted line C represents the surface of the cast material (the portions of the gasket 10' below line C are embedded in the cast material).

The embodiment 10' eliminates and/or significantly reduces profile thinning and water infiltration by providing a connecting web 14 with a pair of annular projections 14a, 14b which extend around the entire gasket (each defining an annular ring) and which project outwardly from opposite sides of connecting web 14. In addition, an integral, substantially triangular-shaped projection 16b extends radially inwardly from the inner periphery of flange 16 forming a part of the T-shaped embedment portion. The projection 1Gb is a substantially continuous, annular-shaped projection.

The projections 14a, 14b and 16b significantly reduce thinning of the gasket embedment profile. As the gasket is bent from its rest position shown in FIG. 1 due to insertion of a pipe 24, as shown in FIG. 3, the gasket bends in the manner shown in FIG. 3 which tends to stretch connecting web 14. The annular projections 14a and 14b which are anchored in the cast material prevent stretching and pulling of the connecting web from the cast material respectively due to the anchoring of the web as well as due to the significantly increased thickness of the connecting web measured from tip to tip of the projections 14a, 14b.

The stretching of the connecting web in a conventional gasket tends to develop a force which is concentrated in the mid-portion of flange 16 tending to cause the mid-portion of flange 16 to be lifted away from its embedded position and moved radially inwardly. Collectively, the triangular-shaped projection 16b prevents this tendency. The projections 14a, 14b and 16b thus effectively reduce the thinning of the profile and substantially eliminate water infiltration around the waterstop as well as eliminating or reducing profile thinning, especially in drycast applications.

The conventional gasket may also utilize the projections shown in FIG. 4a to great advantage. FIG. 4b shows an arrangement of the conventional waterstop gasket described more fully in U.S. Pat. No. Re 34, 787, referred to hereinabove.

The gasket 10" of FIG. 4b shows an arrangement of the conventional gasket 10" incorporating the projections 14a, 14b and 16b, as well as the connecting web 14 of increasing thickness substantially as shown in FIGS. 1, 2 and 4a, for example. Thus, although the embodiment 10" lacks the advantages of the waterstop design of the present invention, the novel connecting web 14 and projections 14a, 14b and 16b of the present invention provide a conventional gasket with the advantageous features described hereinabove.

The gasket of the present invention provides superior sealing capabilities as compared with conventional gaskets of similar design while being of reduced size and weight thereby significantly reducing the cost of materials and hence the cost of production. The gasket design, size, volume and durometer further enable the gasket to accommodate a wider tolerance of pipe diameter, enabling, for example, gaskets of four cross-sectional sizes to typically c(over a complete range of pipe sizes from 4 inches to 84 inches pipe diameter as well as accommodating both rigid and flexible pipe.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A bidirectional annular gasket for providing a water-tight seal between an opening in a barrier wall and a pipe inserted into said opening, said gasket comprising a ring of elastomeric material having a substantially uniform cross-section along its circumferential length, said cross-section comprising a T-shaped anchoring portion including a radially-outwardly directed, substantially cylindrical-shaped foot portion and a neck portion integral with said foot portion and extending at right angles and radially inward therefrom to form said T-shaped anchoring portion and a head portion extending radially inward of said foot portion for engagement with the exterior of said pipe;

said head portion having a substantially A-shaped configuration defined by a wide end tapering to a narrow tip, with the wide end of said A-shaped configuration defining outside corners being positioned adjacent said anchoring portion and a narrow tip forming an apex of said head portion and, prior to insertion of a pipe, extending radially inwardly from and being remote from said anchoring portion;

the head portion, prior to insertion of a pipe, being substantially symmetrical about a plane passing through the center of the head portion and aligned with said radial direction;

the wide end of said head portion being provided with an inverted, substantially V-shaped recess defining a pair of legs extending diagonally outward and away from said head portion;

said neck portion serving as a connecting web joining said A-shaped configuration and said T-shaped anchoring portion and being integrally joined to the wide end of said A-shaped configuration substantially at midpoint of said recess;

said connecting web dividing said recess into a pair of pockets on opposite sides of said web; and said connecting web gradually increasing in thickness from one end connected to the anchoring portion to another end connected to the wide end of the head portion whereby the connecting web is wider at said another end than said one end.

2. The gasket of claim 1 having at least a hollow annular cavity in said head portion to reduce compressibility of said head portion.

3. The gasket of claim 1 further comprising:
a substantially continuous, triangular-shaped projection integral with said foot portion and extending radially outward therefrom for embodiment in the barrier wall an apex of the triangular-shaped portion being joined to said foot portion.

4. The gasket of claim 6 further comprising a pair of ring-shaped projections integral with and extending outwardly from opposing sides of said connecting web for embedment in the barrier wall.

5. A bidirectional annular gasket for providing a watertight seal between an opening in a barrier wall and a pipe inserted into said opening, said gasket comprising a ring of elastomeric material having a substantially uniform cross-section along its circumferential length, said cross-section comprising a T-shaped anchoring portion including a radially-outwardly directed, substantially cylindrical-shaped foot portion and a neck portion integral with said foot portion and extending at right angles and radially inward therefrom to form said T-shaped anchoring portion and a head portion extending radially inward of said foot portion for engagement with the exterior of said pipe;

said head portion having a sub stantially A-shapaed configuration defined by a wide end tapering to a narrow tip, with the wide end of said A-shaped configuration defining outside corners being positioned adjacent said anchoring portion and a narrow tip forming an apex of said head portion and, prior to insertion of a pipe, extending radially inwardly from and being remote from said anchoring portion;

the head portion, prior to insertion of a pipe, being substantially symmetrical about a plane passing through the center of the head portion and aligned with said radial direction;

the wide end of said head portion being provided with an inverted, substantially V-shaped recess defining a pair of legs extending diagonally outward and away from of said head portion;

said neck portion serving as a connecting web joining said A-shaped configuration and said T-shaped anchoring portion and being integrally joined to the wide end of said A-shaped configuration substantially at midpoint of said recess;

said connecting web dividing said recess into a pair of pockets on opposite sides of said web; and said connecting web gradually increasing in thickness from one end connected to the anchoring portion to another end connected to the wide end of the head portion whereby the connecting web is wider at said another end than said one end said outwardly directed foot portion has projections extending in opposing directions away from an axis of symmetry of said gasket, at least one of said projections having a tip thereof at a distance D from the axis of symmetry which is equal to a distance D between said axis of symmetry and one corner of a wide end of said head portion to assure that the gasket, after extrusion and during conveyance by a conveyor through a curing region as the said tip and said corner engaging said conveyor prevents the connecting web portion from bending away from a desired configuration.

6. The gasket of claim 5 wherein said tip and said corner engaging the conveyor are rounded.

7. A bidirectional annular gasket for providing a watertight seal between an opening in a barrier wall and a pipe inserted into said opening, said gasket comprising a ring of elastomeric material having a substantially uniform cross-section along its circumferential length, said cross-section comprising a T-shaped anchoring portion including a radially-outwardly directed, substantially cylindrical-shaped foot portion and a neck portion integral with said foot portion and extending at right angles and radially inward therefrom to form said T-shaped anchoring portion and a head portion extending radially inward of said foot portion for engagement with the exterior of said pipe;

said head portion having a substantially A-shaped configuration defined by a wide end tapering to a narrow tip, with the wide end of said A-shaped configuration defining outside corners being positioned adjacent said anchoring portion and a narrow tip forming an apex of said head portion and, prior to insertion of a pipe, extending radially inwardly from and being remote from said anchoring portion;

the head portion, prior to insertion of a pipe, being substantially symmetrical about a plane passing through the center of the head portion and aligned with said radial direction;

the wide end of said head portion being provided with an inverted, substantially V-shaped recess defining a pair of legs extending diagonally outward and away from of said head portion;

said neck portion serving as a connecting web joining said A-shaped configuration and said T-shaped anchoring portion and being integrally joined to the wide end of said A-shaped configuration substantially at midpoint of said recess;

said connecting web dividing said recess into a pair of pockets on opposite sides of said web; and said connecting web gradually increasing in thickness from one end connected to the anchoring portion to another end connected to the wide end of the head portion whereby the connecting web is wider at said another end than said one end a surface of the head portion extending between the outside corners of the head portion and the connecting web being diagonally aligned relative to the axis of symmetry, each forming an inside corner with said web and having an acute angle to define a pair of self-energizing water pockets.

8. A bidirectional annular gasket for providing a watertight seal between an opening in a barrier wall and a pipe inserted into said opening, said gasket comprising a ring of elastomeric material having a substantially uniform cross-section along its circumferential length, said cross-section comprising a T-shaped anchoring portion including a radially-outwardly directed foot portion and a neck portion integral with said foot portion and extending at right angles and radially inward therefrom to form said T-shaped anchoring portion and a head portion extending radially inward of said foot portion for engagement with the exterior of said pipe;

said head portion having a substantially A-shaped configuration defined by a wide end tapering to a narrow tip, with the wide end of said A-shaped configuration defining outside corners being positioned adjacent said anchoring portion and a narrow tip forming an apex of said head portion and, prior to insertion of a pipe, extending radially inwardly from and being remote from said anchoring portion;

the head portion, prior to insertion of a pipe, being substantially symmetrical about a plane passing through the center of the head portion and aligned with said radial direction;

the wide end of said head portion being provided with an inverted, recess defining a pair of legs extending diagonally outward and away from said head portion;

said neck portion serving as a connecting web joining said A-shaped configuration and said anchoring portion and being integrally joined at a first end to the wide end of said A-shaped configuration substantially at midpoint of said recess and at a second end to a radially inward end of said neck portion;

said connecting web dividing said recess into a pair of pockets on opposite sides of said web;

said connecting web gradually increasing in thickness from one end connected to the anchoring portion to another end connected to the wide end of the head portion whereby the connecting web is wider at said another end than said one end; and a substantially continuous, triangular-shaped projection integral with said foot portion and extending radially outward therefrom for embedment in the barrier wall an apex of the triangular-shaped portion being joined to said foot portion.

9. The gasket of claim 8 further comprising a pair of ring-shaped projections integral with and extending outwardly from opposing sides of said connecting web for embedment in the barrier wall.

* * * * *

UNITED STATES PATENT AND TRADEMARK OFFICE
CERTIFICATE OF CORRECTION

PATENT NO. : 5,997,006
DATED : December 7, 1999
INVENTOR(S) : Westhoff et al.

Page 1 of 1

It is certified that error appears in the above-identified patent and that said Letters Patent is hereby corrected as shown below:

Column 1,
Line 22, after the word "substantially", delete "tight" and insert therefor -- right --.

Column 2,
Line 66, after the word "to", delete "be(ndabihty" and insert therefor -- bendability --.

Column 4,
Line 67, after the word "angle" delete "a" and insert therefor -- α --.

Column 8,
Line 9, after the word "projection", delete "1Gb" and insert therefor -- 16b --.
Line 55, after the word "typically", delete "c(over" and insert therefore -- cover --.

Column 9, claim 5,
Line 65, after the word "a", delete "sub stantially" and insert therefor -- substantially --.
Line 65, delete "A-shapaed" and insert therefor -- A-shaped --.

Signed and Sealed this

Thirteenth Day of November, 2001

Attest:

NICHOLAS P. GODICI
Attesting Officer    Acting Director of the United States Patent and Trademark Office